United States Patent [19]

Akao et al.

[11] Patent Number: 4,803,766
[45] Date of Patent: Feb. 14, 1989

[54] MOUNTING OF CERAMIC TIP ON METAL ROCKER ARM

[75] Inventors: Shigeaki Akao; Masato Taniguchi; Takio Kojima, all of Nagoya, Japan

[73] Assignee: NGK Spark Plug Co., Ltd., Nagoya, Japan

[21] Appl. No.: 134,042

[22] Filed: Dec. 17, 1987

[30] Foreign Application Priority Data

Dec. 27, 1986 [JP] Japan .................. 61-202324[U]

[51] Int. Cl.⁴ .............................................. B23P 15/00
[52] U.S. Cl. .................... 29/156.4 R; 123/90.39
[58] Field of Search .................. 29/156.4 R, 156.7 B; 123/90.36, 90.39, 90.41, 90.44; 428/457, 547, 552, 594, 627, 556; 228/120, 121, 122

[56] References Cited

U.S. PATENT DOCUMENTS

| | | | |
|---|---|---|---|
| 4,147,074 | 4/1979 | Noguchi et al. | 123/90.39 |
| 4,627,392 | 12/1986 | Tashiro | 123/90.39 |
| 4,729,504 | 3/1988 | Edamosa | 228/122 |
| 4,735,866 | 4/1988 | Moorhead | 228/122 |

FOREIGN PATENT DOCUMENTS

| | | | |
|---|---|---|---|
| 8308 | 1/1982 | Japan | 123/90.39 |
| 39909 | 3/1984 | Japan | 123/90.39 |
| 194008 | 11/1984 | Japan | 123/90.39 |
| 35107 | 2/1985 | Japan | 123/90.39 |

Primary Examiner—P. W. Echols
Assistant Examiner—Kevin Jordan
Attorney, Agent, or Firm—Foley & Lardner, Schwartz, Jeffery, Schwaab, Mack, Blumenthal & Evans

[57] ABSTRACT

An end of a rocker arm proper is formed into a stepped shape and includes a base section and a mounting section projecting outwardly from the base section. A ceramic tip and a soldering or brazing metal have the same plane figure as the mounting section. The ceramic tip is soldered or brazed to the mounting section by means of a continuous furnace. During conveyance by a conveyor to and from the continuous furnace, the ceramic tip and the soldering or brazing metal are held in place on the mounting section by a jig. The jig is in the form of a framework and adapted to be installed on the base section and fittingly receive therein the mounting section. The jig is also adapted to fittingly receive therein the ceramic tip and the soldering or brazing metal.

4 Claims, 2 Drawing Sheets

MOUNTING OF CERAMIC TIP ON METAL ROCKER ARM

BACKGROUND OF THE INVENTION

1. Field of the Invention

The present invention relates in general to rocker arms for internal combustion engines and more particularly to a metal rocker arm of the kind having a ceramic tip in the place for contact with a cam.

2. Description of the Prior Art

It is known to mount a sintered metal or hard metal tip on the section of a rocker arm for contact with a valve operating cam. The sintered metal or hard metal tip is soldered or brazed to the rocker arm proper by induction heating.

In place of such a sintered metal or hard metal tip, it is also known to utilize a tip made of ceramics, as silicon nitride, silicon carbide or sialon, that is light in weight and has an excellent heat and wear resistivity, in order to cope with a recent automotive engine trend to high performance. In soldering or brazing of such a ceramic tip, it is necessary to utilize a continuous furnace together with a conveyor since the ceramic tip cannot be heated to a desired high temperature by induction heating.

During conveyance by the conveyor, the ceramic tip and the soldering or brazing metal are liable to move relative to each other due to vibrations of the conveyor. Such movement may cause inferior or faulty producs, for example, may cause cracks in the ceramic tip.

SUMMARY OF THE INVENTION

In accordance with one embodiment of the present invention, there is provided a novel and improved rocker arm which comprises a rocker arm proper made of metal and having an end, a ceramic tip mounted on the above mentioned end of the rocker arm proper, and a brazing metal securing the ceramic tip to the above mentioned end of the rocker arm proper. The end of the rocker arm proper is in the form of a stepped configuration and includes a base section and a mounting section projecting outwardly from the base section. The ceramic tip and the mounting section have the same plane figure.

In accordance with another embodiment of the present invention, there is provided a novel and improved method of mounting a ceramic tip on a metal rocker arm, which comprises preparing a rocker arm proper made of metal, forming an end of the rocker arm proper in such a way that the above mentioned end of the rocker arm proper includes a base section and a mounting section projecting outwardly from the base section, preparing a jig in the form of a framework and capable of fittingly receiving therein the mounting section when installed on the base section, the jig being also capable of fittingly receiving therein the ceramic tip and the brazing metal, inserting the brazing metal and the ceramic tip into the jig and allowing the same to be sequentially laid one upon the other on the mounting section, and heating the above mentioned end of the rocker arm proper, the ceramic tip and the brazing metal by a continuous furnace and thereby brazing the ceramic tip to the mounting section.

The structure and method described above can solve the above noted problem inherent in the prior art device.

It is accordingly an object of the present invention to provide a novel and improved rocker arm of the kind having a ceramic tip in the place for contact with a cam, which can reduce the rated number of inferior or faulty products.

It is another object of the present invention to provide a novel and improved rocker arm of the above described character, of which ceramic tip can be soldered or brazed in position with increased accuracy and assuredness.

It is a further object of the present invention to provide a novel and improved rocker arm of the above described character which is adapted to be heated by a continuous furnace for soldering or brazing the ceramic tip in position.

It is a further object of the present invention to provide a novel and improved method of producing a rocker arm of the above described character.

DETAILED DESCRIPTION OF THE PREFERRED EMBODIMENT

Figure 1:
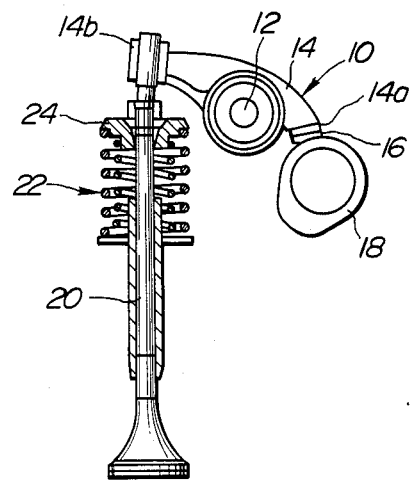
FIG. 1 is a side elevational view of a rocker arm according to an embodiment of the present invention, together with associated parts of a valve operating unit for an internal combustion engine.

Referring first to FIG. 1, a rocker arm according to an embodiment of the present invention is generally indicated by the reference numeral 10 and rockable about a rocker shaft 12. The rocker arm 10 consists of a rocker arm proper 14 made of metal and a ceramic tip 16 installed on an end 14a of the rocker arm proper 14 for contact with a cam 18. The other end 14b of the rocker arm proper 14 is brought into contact with an end of a valve 20. Valve springs 22 and a retainer 24 are provided for urging the valve 20 toward its closed position, i.e., toward the other end 14b of the rocker arm proper 14.

Figure 2:
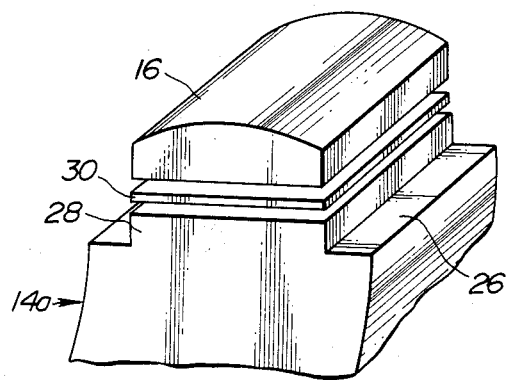
FIG. 2 is an enlarged fragmentary exploded view of the rocker arm of FIG. 2.

As seen from FIG. 2, the end 14a of the rocker arm proper 14 has a stepped configuration and includes a base section 26 and a mounting section 28 projecting outwardly from the base section 26. The mounting section 28 is adapted to mount thereon the ceramic tip 16 and a soldering or brazing metal 30. The mounting section 28, ceramic tip 16 and the soldering or brazing metal 30 are so shaped as to have the same plane figure or outer peripheral shape.

Figure 3:
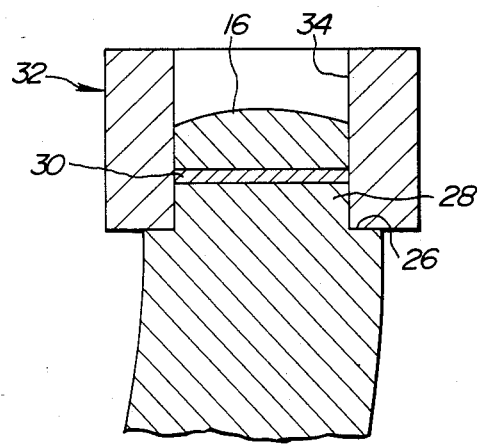
FIG. 3 is a fragmentary sectional view of the rocker arm of FIG. 2, together with a jig for location of a ceramic tip and a soldering or brazing metal.
Figure 4:
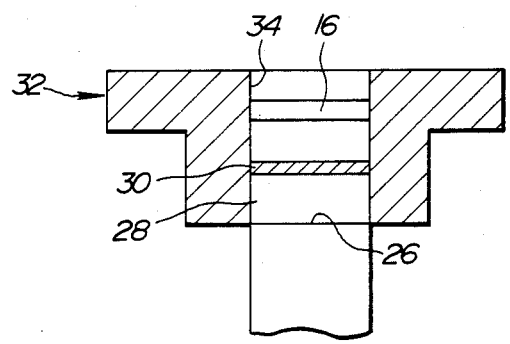
FIG. 4 is a fragmentary side view of the rocker arm of FIG. 3, togetehr with the jig illustrated in section.

As shown from FIGS. 3 and 4, a jig 32 is used for locating and holding the ceramic tip 16 and the soldering or brazing metal 30 in place on the mounting section 28 during soldering or brazing of the ceramic tip 16. The jig 32 is in the form of a framework and adapted to be installed on the base section 26 and fittingly receive therewithin the mounting section 28. The jig 32 also fittingly receives therewithin the ceramic tip 16 and the soldering or brazing metal 30 and thereby hold the same in place on the mounting section 28.

In the illustrated embodiment, the mounting section 28 is formed into a rectangular shape. The ceramic tip 16 and the soldering or brazing metal 30 are therefore formed so as to have the same rectangular plane figure or outer peripheral shape as the mounting section 28. The jig 32 is formed with a rectangular through hole 34 of uniform cross section and adapted to fittingly receive the mounting section 28 within the rectangular through hole 34. The base section 26 is in the form of a pair of shoulders on the opposite sides of the rectangular mounting section 28.

In assembly, the jig 32 is installed on the base section 26 at the end 14a of the rocker arm proper 14 in such a manner as to receive the mounting section 28 within the through hole 34. The soldering or brazing metal and 30 and the ceramic tip 16 are inserted into the through hole 34 and sequentially laid one upon the other on the mounting section, i.e., placed on the mounting section in such a manner that the soldering or brazing metal 30 is interposed between the mounting section 28 and the ceramic tip 16.

From the foregoing, it is to be understood that the ceramic tip 16 and the soldering or brazing metal 30 are held accurately and assuredly within the jig 32 which is in turn held accurately and assuredly on the end 14a of the rocker arm proper 14 during conveyance by a conveyor for heating by a continuous furnace.

What is claimed is:

1. A method of mounting a ceramic tip on a metal rocker arm, comprising:
   preparing a rocker arm proper made of metal;
   forming an end of said rocker arm proper in such a way that said end of said rocker arm proper includes a base section and a mounting section projecting outwardly from said base section;
   preparing a jig in the form of a framework and capable of fittingly receiving therein said mounting section when installed on said base section, said jig being also capable of fittingly receiving therein said ceramic tip and said brazing metal;
   inserting said brazing metal and said ceramic tip into said jig and allowing the same to be sequentially laid one upon the other on said mounting section; and
   heating said end of said rocker arm proper, said ceramic tip and said brazing metal by a continuous furnace and thereby brazing said ceramic tip to said mounting section.

2. A method as set forth in claim 1 wherein said preparing of said jig further comprises forming in said jig a rectangular through hole in which said mounting section, said brazing metal and said ceramic tip are fittingly received.

3. A method as set forth in claim 1 wherein said forming of said end of said rocker arm proper further comprises forming said mounting section, said ceramic tip and said brazing metal in such a way as to have the same plane figure and be capable of fitting in said through hole of said jig.

4. A method as set forth in claim 1 wherein said forming of said end of said rocker arm proper further comprises shaping said base section into the form of a pair of shoulders at the opposite ends of said mounting section.

* * * * *